Patented Dec. 21, 1926.

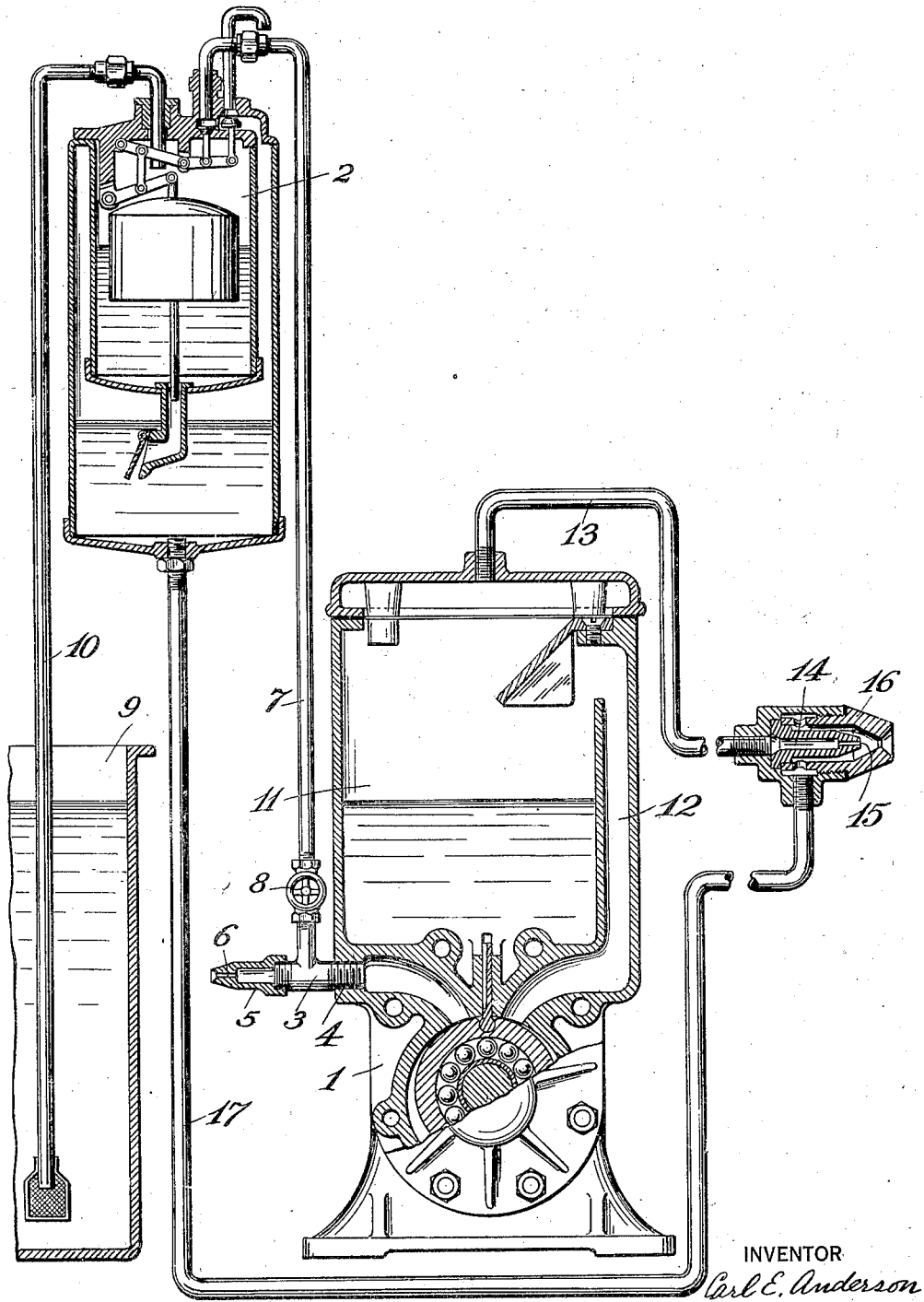

1,611,846

UNITED STATES PATENT OFFICE.

CARL E. ANDERSON, OF BROOKLYN, NEW YORK, ASSIGNOR TO AMERICAN MACHINE & FOUNDRY COMPANY, A CORPORATION OF NEW JERSEY.

POWER ATOMIZER.

Application filed February 4, 1924. Serial No. 690,386.

This invention relates to a power atomizer for spraying liquids. The main object of the invention is the production of a power atomizer, particularly adapted for use in oil burning systems, and which is simpler than known devices adapted for such use, and less expensive to install and maintain. With this and other objects not specifically mentioned in view, the invention consists in certain constructions and combinations which will be hereinafter fully described and then specifically set forth in the claims hereunto appended.

In the accompanying drawing, which forms a part of this specification and in which like characters of reference indicate the same or like parts, the figure is an elevation, partly in section, of a device constructed in accordance with the invention.

In carrying the invention into effect, there is provided an air pump of any suitable type, a vacuum device (such for example as the well known Stewart vacuum tank), an intake for the pump which is in communication with said device or vacuum tank and also with the atmosphere, and a constricted outlet for the pump to cause outflow under pressure, to the end that a part of the air drawn into the pump comes directly and continuously from the atmosphere, another part comes intermittently from the vacuum device or tank, and all the air is discharged from the pump under pressure for atomizing purposes. There is further provided means for regulating the action of the intake in accordance with the nature of the liquid to be sprayed and other conditions; a conduit leading from the vacuum device or tank to the pump outlet; and a supply tank in communication with said device, the liquid being raised from the supply tank to the vacuum device or tank by atmospheric pressure when a partial vacuum is produced in the vacuum device or tank by the action of the pump. All of these parts may be widely varied in construction within the scope of the claims for the particular device selected to illustrate the invention is but one of many possible concrete embodiments of the same. The invention therefore is not to be restricted to the precise details of the structure shown and described.

Referring to the drawing, 1 indicates a rotary pump of the type described in my co-pending application filed December 22, 1923, Serial No. 682,135, to which reference is made for a full disclosure thereof. There is further provided a vacuum device 2 of the well known Stewart type, which needs no detailed description herein. There is further provided an intake for said pump and, as shown, this intake includes a T-pipe 3, one branch of which is threaded into the suction side of the pump at 4. Another branch carries a short pipe 5 having a constricted orifice 6 in open communication with the atmosphere. The third branch of the T-pipe 3, is united with a pipe 7 in communication with the intake and with the vacuum device 2. Thus, the intake is in communication with the vacuum device and with the atmosphere. Means are provided for regulating the action of said intake and, as shown, this means consists of a valve 8 between the vacuum device 2 and the intake 3.

There is further provided a supply tank 9 for holding the liquid to be sprayed, and this supply tank is kept in communication with the vacuum device 2 by means of a pipe 10.

The pump 1 is provided with a lubricant chamber 11, the operation of which is fully described in my co-pending application above referred to.

A part of the air drawn into the pump comes continuously from the atmosphere, while the other part comes intermittently from the vacuum device 2. From the cylinder of the pump, the air flows through a passage 12 into the lubricating chamber 11 above the lubricant. From this chamber it is expelled through a constricted outlet, as shown, consisting of the pipe 13 and a nozzle 14 provided with a small discharge orifice 15. The purpose of this constricted outlet is to permit the air pressure to build up in the lubricant chamber to a degree sufficient for atomizing purposes.

The nozzle 14 lies within and forms a part of an atomizer 16 of well known construction and operation. A pipe or conduit 17, leading from the vacuum device 2 to the atomizer 16, is provided, and the atomizer is located at a lower level than the vacuum device. The various parts of the structure may be located in any suitable relative position, dependent upon the use to which it is put. When it is used as a part of an oil burning system, however, the supply tank 9 for the fuel oil will, or may be, buried in the ground; the atomizer will be in or in front of the furnace where the oil is burned; the vacuum device or tank will be above the level of the supply tank and atomizer; and the pump may be in any suitable location between the vacuum device and the atomizer.

Assuming that the vacuum device is empty when the pump is started, air will be drawn into the pump, coming in part directly from the atmosphere, and in part from the vacuum device. As soon as a partial vacuum is created in the vacuum device 2, atmospheric pressure drives the liquid from the supply tank 9 up in to the vacuum device, and the liquid will continue to so flow until the float within the vacuum device cuts off the connection between said device and the intake 3. In the meantime, air pressure is built up in the lubricant chamber 11 of the pump and discharged through the orifice 15. The liquid in the vacuum device flows by gravity to the atomizer 16 where it is atomized by the air escaping under pressure. When a little of the liquid in the vacuum device has run down to the atomizer, the float falls and re-establishes communication between the vacuum device and the intake 3, and this intermittent action continues so long as the pump operates and an available supply of liquid remains in the supply tank. This action is the well known action of the Stewart vacuum tank which thus controls the feed of the liquid.

It may be here remarked that the pump is of the rotatary type directly driven by a high speed electric motor; the speed of the pump being great, its size may be small, and since it acts both as a pressure pump and as a vacuum pump, no other pump is required even in an oil burning system.

What is claimed is:

1. The combination with an air pump, of a vacuum tank, an intake for the said pump in communication with said tank and with the atmosphere, a constricted outlet for said pump to cause outflow under pressure, a conduit leading from said tank to said outlet, and a supply tank in communication with said tank.

2. The combination with an air pump, of a vacuum tank, an intake for said pump in communication with said tank and with the atmosphere, a constricted outlet for said pump to cause outflow under pressure and terminating in an atomizer, a conduit leading from said tank to said atomizer, and a supply tank in communication with said tank.

3. The combination with an air pump, of a vacuum tank, an intake for said pump in communication with said tank and with the atmosphere, a constricted outlet for said pump to cause outflow under pressure and terminating in an atomizer, a conduit leading from said tank to said atomizer, a supply tank in communication with said tank, and means for regulating the action of said intake.

4. The combination with an air pump, of a vacuum tank, an intake for said pump in communication with said tank and with the atmosphere, a constricted outlet for said pump to cause outflow under pressure and terminating in an atomizer a conduit leading from said tank to said atomizer, a supply tank in communication with said tank, and a valve for regulating the action of said intake.

5. The combination with an air pump, of a vacuum tank, an intake for said pump in communication with said tank and with the atmosphere, a constricted outlet for said pump to cause outflow under pressure and terminating in an atomizer, a conduit leading from said tank to said atomizer, a supply tank in communication with said tank, and a valve between said intake and said tank.

6. The combination with an air pump, of a vacuum tank, an intake for said pump in communication with said tank, and with the atmosphere, a constricted outlet for said pump to cause outflow under pressure and terminating in an atomizer at a lower level than said tank, a conduit leading from said tank to said atomizer, and a supply tank in communication with said tank.

In testimony whereof, I have signed my name to this specification.

CARL E. ANDERSON.